(12) United States Patent
Maedebach et al.

(10) Patent No.: US 10,022,648 B2
(45) Date of Patent: Jul. 17, 2018

(54) SYSTEM FOR SEPARATING AND CONCENTRATING A LIQUID COMPONENT FROM A LIQUID MULTI-COMPONENT MIXTURE, COMPRISING A HEAT PUMP

(75) Inventors: Eckard Maedebach, Braunschweig (DE); Frank Kinner, Ettlingen (DE)

(73) Assignee: GEA Wiegand GmbH, Ettlingen (DE)

( * ) Notice: Subject to any disclaimer, the term of this patent is extended or adjusted under 35 U.S.C. 154(b) by 671 days.

(21) Appl. No.: 14/344,432

(22) PCT Filed: Sep. 7, 2012

(86) PCT No.: PCT/EP2012/067537
§ 371 (c)(1),
(2), (4) Date: Mar. 12, 2014

(87) PCT Pub. No.: WO2013/037712
PCT Pub. Date: Mar. 21, 2013

(65) Prior Publication Data
US 2014/0339069 A1 Nov. 20, 2014

(30) Foreign Application Priority Data
Sep. 12, 2011 (DE) .................. 10 2011 082 513

(51) Int. Cl.
*B01D 3/14* (2006.01)
*B01D 3/00* (2006.01)

(52) U.S. Cl.
CPC ............. *B01D 3/143* (2013.01); *B01D 3/007* (2013.01)

(58) Field of Classification Search
CPC ................................ B01D 3/007; B01D 3/143
(Continued)

(56) References Cited

U.S. PATENT DOCUMENTS 4,256,541 A * 3/1981 Muller .................... C07C 29/80
                                                  203/19
4,306,942 A * 12/1981 Brush .................... B01D 3/001
                                                  203/19
(Continued)

FOREIGN PATENT DOCUMENTS

DE          1114168 B    9/1961
JP          02184643     7/1990

OTHER PUBLICATIONS

International Search Report dated Feb. 8, 2013 in connection with PCT/EP2012/067537.

*Primary Examiner* — Jonathan Miller
(74) *Attorney, Agent, or Firm* — Locke Lord LLP; Scott D. Wofsy

(57) ABSTRACT

In order to separate and concentrate a liquid component from a liquid multi-component mixture formed of several liquid components with different boiling temperatures, e.g. an ethanol-water mixture, a concentration apparatus (3) is proposed, with its separation section and concentration section designed as separate columns (5, 7) with different operating energy requirements.

The column (7) with the higher operating energy requirements is designed for a lower temperature difference between the boiling temperature of the top of the column (29) and the boiling temperature of the bottom of the column (21) than the column (5) with lower operating energy requirements. Separate mechanical vapour compressors (15, 27) are assigned to the two columns (5, 7), said vapour compressors compressing the vapours from the top of the associated column (5, 7) and supplying the operating energy to the bottom region (11, 21) of the respective column (5, 7) by means of separate sump evaporators (9, 23) which act as reboilers.

4 Claims, 1 Drawing Sheet

(58) Field of Classification Search
USPC .......................................................... 203/25
See application file for complete search history.

(56) References Cited

U.S. PATENT DOCUMENTS

| | | | | |
|---|---|---|---|---|
| 4,539,076 A * | 9/1985 | Swain | ................... | B01D 1/2856 |
| | | | | 202/154 |
| 4,615,769 A * | 10/1986 | Horigome | ................. | C07C 7/04 |
| | | | | 202/182 |
| 4,961,826 A * | 10/1990 | Grethlein | ............. | B01D 1/2856 |
| | | | | 202/154 |
| 5,035,776 A * | 7/1991 | Knapp | ..................... | B01D 3/40 |
| | | | | 203/19 |
| 5,124,004 A * | 6/1992 | Grethlein | ............. | B01D 1/2856 |
| | | | | 202/154 |
| 5,252,187 A * | 10/1993 | Ohtsu | ....................... | B01D 1/26 |
| | | | | 159/24.2 |
| 5,294,304 A * | 3/1994 | Kano | ....................... | C07C 29/84 |
| | | | | 203/19 |
| 7,867,365 B2 * | 1/2011 | Brown | ................... | B01D 3/002 |
| | | | | 159/2.1 |
| 8,182,654 B2 * | 5/2012 | Sechrist | ................ | B01D 3/007 |
| | | | | 203/26 |

* cited by examiner

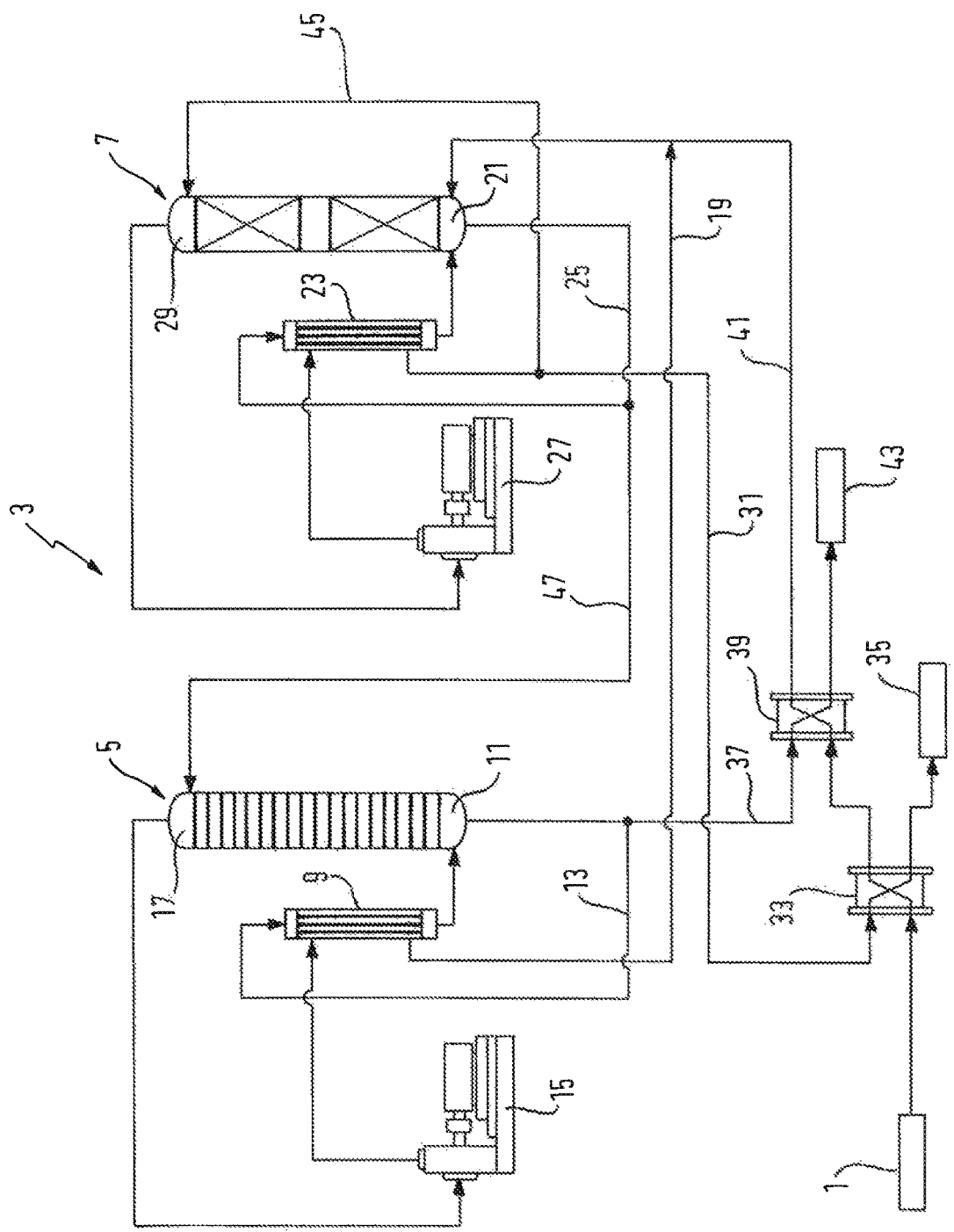

SYSTEM FOR SEPARATING AND CONCENTRATING A LIQUID COMPONENT FROM A LIQUID MULTI-COMPONENT MIXTURE, COMPRISING A HEAT PUMP

The invention relates to a plant for separating and concentrating a liquid component from a liquid multi-component mixture formed from several liquid components with different boiling temperatures. In particular, the invention relates to a rectification plant.

Distillation plants allow a liquid component to be separated and concentrated from a liquid multi-component mixture if the multi-component mixture consists of several liquid components with sufficiently different boiling temperatures. Examples of such mixtures include ethanol-water mixtures or isopropanol-water mixtures from which the alcohol can be separated and further concentrated or fortified at the same time with respect to the alcohol concentration of the mixture. The concentration process can be achieved by means of rectification, i.e. purification of the concentrated alcohol.

Compared with separating raw alcohol from fermented, i.e. attenuated mash containing alcohol in a first distillation column, further concentrating the alcohol by repeated distillation is considerably more energy-intensive. The energy balance for the concentration or rectification apparatus in the distillation plant must therefore be given special consideration. The operating energy is usually supplied to the concentration apparatus in the form of live steam. Usual practice involves reducing the energy consumption of the distillation plant by recovering the thermal energy from the vapours from the top of the concentration apparatus. Compressing the vapours from the top of a distillation column using a mechanical vapour compressor until the energy content of the compressed vapours is sufficient to heat a distillation column reboiler is thus known in the art. When rectifying ethanol from an ethanol-water mixture, the boiling temperatures of the individual components differ to a comparatively large degree. Whilst the boiling temperature of ethanol is around 78° C., the boiling temperature of water is 100° C. When recovering and recycling operating energy from the vapours from the top of the rectification column by means of a mechanical vapour compressor, this large temperature difference leads to the vapour compressor having a very high compression ratio and correspondingly high electrical energy requirements.

WO 2008/135192 A1 discloses an alcohol rectification plant in which the raw alcohol supplied from a first distillation column is supplied as the feed to a single rectification column. The head condenser of the rectification column also heats the raw alcohol and produces vapour in a first evaporation separator, said steam being supplied to a concentration section of the rectification column by means of a first mechanical compressor. In a second evaporation separator which supplies the rectified alcohol, alcohol vapour is separated and heats a reboiler connected to the bottom region of the rectification column via a second mechanical compressor. It is thus possible to recover the majority of the energy to be provided to operate the rectification column.

The object of the invention is to show how to further reduce, and in particular optimise, the energy balance of a plant for separating and concentrating a liquid component from a liquid multi-component mixture.

The invention is based on a plant for separating and concentrating a liquid component from a liquid multi-component mixture formed from several liquid components with different boiling temperatures, the plant comprising: a concentration apparatus with a separation section and a concentration section, a first mechanical vapour compressor supplying operating energy for the separation section and a second mechanical vapour compressor supplying operating energy for the concentration section.

The plant according to the invention is characterised in that the separation section and the concentration section are defined as separate columns with different operating energy requirements, the column with the higher operating energy requirements being designed for a lower temperature difference between the boiling temperature of the top of the column and the boiling temperature of the bottom of the column than the column with the lower operating energy requirements, in that the first mechanical vapour compressor compresses vapours from the top of the separation section column and supplies the operating energy to the bottom region of the separation section column by means of a first sump evaporator acting as a reboiler, in that the second mechanical vapour compressor compresses vapours from the top of the concentration section column and supplies the operating energy to the bottom region of the concentration section column by means of a second sump evaporator acting as a reboiler, and in that the multi-component mixture and vapour product and/or condensate product from which energy is recovered in the first sump evaporator can be supplied as feed to the concentration section column.

In such a concentration apparatus, which in some cases forms a rectification apparatus, the separation section column and the concentration section column can be designed separately both with regard to the temperature difference between the top boiling temperature and the bottom boiling temperature and also with regard to energy requirements. A low temperature difference can be assigned to the column with the higher thermodynamic energy requirements, whilst the column with the lower energy requirements is designed for a larger temperature difference. Both columns are heated by separate mechanical vapour compressors and sump evaporators for this purpose. The mechanical vapour compressor designed for the lower temperature difference may be designed for a smaller compression level than the compressor heating the column with the greater temperature difference. The lower compression level makes it possible to operate the mechanical vapour compressor at optimum cost even with higher thermodynamic energy requirements. The same applies to the mechanical vapour compressor for the column designed for the higher temperature difference, as in this case the vapour compressor can achieve the higher compression level with lower thermodynamic energy requirements. The concentration section column is preferably designed for the higher energy requirements.

Compared with traditional concentration apparatus with only a single column and a mechanical vapour compressor, savings of up to 50% of the electrical energy requirements for vapour compression can be made with a plant according to the invention when rectifying an isopropanol-water mixture. 40% electrical energy savings are possible with an ethanol-water mixture.

The plant according to the invention is not only suitable for further concentrating ethanol from an ethanol-water mixture or isopropanol from an isopropanol-water mixture, but is also suitable for all solvent mixtures in which there is a large concentration-dependent difference between the boiling temperature in the column sump or bottom and the condensation temperature of the product at the top of the concentration column. As a general rule, the plant can be used for separating liquid multi-component mixtures by distillation. In this case, the electrical energy savings which can be made are also a function of the concentration-dependent temperature differences and the thermal energy requirements in the separation section column or the concentration section column.

It is evident that each individual stage in multi-stage concentration apparatus can be formed by separate columns for the separation section and the concentration section, supplying energy separately by means of mechanical vapour compressors. The fortification section between the separation section column and the respective associated concentration section column can be selected as different values, just as different reflux ratios can be selected between the concentration section column and the separation section column.

The plant according to the invention not only permits separation of liquid multi-component mixtures in which the component with a lower boiling point is present in the mixture with a low dilution level, but also permits separation of a component with a higher boiling point which is present in the mixture with a low dilution level if there is a large, concentration-dependent temperature difference between the top of the column and the column sump at the same time. Such mixtures can traditionally only be separated with a relatively high thermal energy outlay, as the majority of the mixture has to be driven through the top of the column. In this case, using a mechanical vapour compressor is not an attractive proposition in traditional plants due to the resulting large compression ratio. In the context of the invention, the thermal energy required can also be reduced considerably in this case.

In order to adapt the separation section column and the concentration section column better to each other, the multi-component mixture and/or the vapour product and/or condensate product from which energy is recovered in the first sump evaporator are preferably supplied to the bottom region of the concentration section column.

The plant's total energy balance can be reduced if the vapour product and/or condensate product from which energy is recovered in the second sump evaporator is used to heat a heat exchanger which warms up the inflowing multi-component mixture and condenses the concentrated liquid component. A corresponding advantage can be achieved if a residual liquid component of the multi-component mixture, said residual component remaining after separating the liquid component to be concentrated and arising in the bottom region of the separation section column, heats the inflowing multi-component mixture via a heat exchanger.

For reasons of expediency the first sump evaporator and the second sump evaporator are connected to the bottom region of the separation section column or the bottom region of the concentration section column by separate forced circulation circuits. This makes it easier to control both columns.

The distillation section column is fed by a feed pipe from the bottom region of the concentration section column, and in particular by a forced circulation circuit in the sump evaporator for the concentration section column.

BRIEF DESCRIPTION OF THE DRAWINGS

FIG. 1 shows a schematic block diagram of a rectification plant for separating and concentrating an alcohol component, particularly ethanol or isopropanol, from a liquid alcohol-water mixture.

An ethanol-water mixture with a concentration of approximately 40 to 60% by volume is supplied at 1 from a distillation plant (which is not shown in further detail) to a concentration or rectification apparatus 3, which separates and further concentrates or fortifies the alcohol components from the mixture. The concentration apparatus 3 comprises a separation section column 5 and a separate concentration section column 7. The separation section column 5 is assigned to a sump evaporator 9 which is located in a forced circulation circuit 13 together with a bottom region 11 of the separation section column 5 and forms a reboiler supplying operating energy to the separation section column 5. The sump evaporator 9 is heated by a mechanical vapour compressor 15 which is driven by an electric motor, said vapour compressor compressing vapours supplied from a top region 17 of the separation section column 5. The alcohol vapours from a top region from which energy is recovered in the sump evaporator 9 and which are at least partially condensed in some cases are supplied as the feed to a bottom region 21 of the concentration section column 7 by means of a connecting pipe 19.

The concentration section column 7 is assigned to a further sump evaporator 23 which is located in a forced circulation circuit 25 together with the bottom region 21 and forms a reboiler for the concentration section column 7. The sump evaporator 23 is heated by a further mechanical vapour compressor 27 driven by an electric motor, said vapour compressor compressing alcohol vapours from a top region 29 of the concentration section column 7 and supplying these to the sump evaporator 23 for heating purposes.

The vapours from which energy is recovered in the sump evaporator 23 and which are at least partially condensed in some cases are supplied to a heat exchanger 33 by means of a pipe 31, said heat exchanger heating the raw alcohol supplied at 1, the alcohol product supplied via the pipe 31 being condensed at the same time and being able to be discharged at 35 as rectified alcohol.

The low wine accruing in the bottom region 11 of the separation section column 5 is supplied to a further heat exchanger 39 by means of a pipe 37, said heat exchanger heating the raw alcohol preheated in the heat exchanger 33 even more and passing it on to the bottom region 21 of the concentration section column 7 as a feed by means of a pipe 41. The low wine accruing during the rectification process may be drawn off at 43.

Some of the product from which energy is recovered in the sump evaporator 23 is supplied to the top region 29 of the concentration section column 7 as reflux by means of a pipe 45. The separation section column 5 is fed by a pipe 47 from the bottom region 21 of the concentration section column 7 or the forced circulation circuit 25.

The concentration section column 7 has higher thermodynamic energy requirements than the separation section column 5. It is designed such that the temperature difference between the boiling temperature in its bottom region 21 and the boiling temperature in its top region 29 is smaller than the temperature difference between the boiling temperature in the bottom region 11 of the separation section column 5 and the boiling temperature in its top region 17. In this manner, the compression level of the mechanical vapour compressor 27 can be designed to be lower than the compression level of the mechanical vapour compressor 15, although the concentration section column 7 has higher energy requirements than the separation section column 5. The overall electrical energy requirements for the concentration apparatus 3 can thus be reduced considerably.

The concentration apparatus 3 described above applies to rectification of ethanol in an ethanol-water mixture. Isopropanol in an isopropanol-water mixture can also be rectified in a similar manner. The plant can thus be used for separating and concentrating liquid components from other liquid multi-component mixtures provided that their liquid components have sufficiently different boiling temperatures. The liquid mixture is supplied at 1 in each case, whilst the distillate can be discharged at 35 and the remaining components from the mixture accrue at 43.

The invention claimed is:

1. A system for separating and concentrating a liquid component from a liquid multi-component mixture formed of several liquid components with different boiling temperatures comprising an ethanol-water mixture or an isopropanol-water mixture, the system comprising:
    a concentration apparatus with two separated columns including a first column forming an output portion column and a second column forming an intensification portion column, the first and second columns configured for different levels of operating energy consumption wherein a bottom region of the intensification portion column is connected to the output portion column by means of a feed pipe;
    a first mechanical vapour compressor configured to deliver operating energy for the output portion column which compresses top alcohol vapours of the output portion column and delivers the operating energy to a bottom region of the output portion column through a first sump evaporator which acts as a reboiler;
    a second mechanical vapour compressor configured to deliver operating energy for the intensification portion column by compressing top alcohol vapours of the intensification portion column and deliver the operating energy to a bottom region of the intensification portion column through a second sump evaporator which acts as a reboiler, a liquid multi-component mixture feed pipe connected to the bottom region of the intensification portion column,
    wherein the intensification portion column has a higher level of operating energy consumption than the output portion column, the intensification portion column adapted for a lower temperature difference between a boiling temperature of a top region and a boiling temperature of the bottom region;
    wherein the second mechanical vapour compressor has a higher level of operating energy consumption than the first mechanical vapour compressor and is configured to deliver the operating energy for the intensification portion column;
    wherein a multi-component mixture condensed in the first sump evaporator is delivered to the intensification portion column as a feed stream; and
    wherein all vapour from the second mechanical compressor flows to the second sump evaporator,
    wherein a first portion of vapour from the second sump evaporator flows to a bottom region of the intensification portion column and a second portion of vapour flows through a pipe to a heat exchanger configured to heat the inflowing multi-component mixture and condense the second portion of vapour from the second sump evaporator.

2. A system according to claim 1, wherein a heat exchanger heated from the bottom region of the output portion column is positioned in the feed path of the multi-component mixture to the intensification portion column.

3. A system according to claim 1, wherein the intensification portion column is configured for higher energy requirements and lower temperature difference than the output portion column.

4. A system according to claim 1, wherein the first sump evaporator and the second sump evaporator are connected to the bottom region of the intensification portion column by a separate forced circuit.

* * * * *